US008514063B2

(12) United States Patent
Stoehr (10) Patent No.: US 8,514,063 B2
(45) Date of Patent: Aug. 20, 2013

(54) TIRE PRESSURE MONITORING SYSTEM HAVING A TEST FUNCTION FOR THE SENSOR MODULE

(75) Inventor: Markus Stoehr, Stuttgart (DE)

(73) Assignee: Knorr-Bremse Systeme Fuer Nutzfahrzeuge GmbH, Munich (DE)

( * ) Notice: Subject to any disclaimer, the term of this patent is extended or adjusted under 35 U.S.C. 154(b) by 187 days.

(21) Appl. No.: 12/998,350

(22) PCT Filed: Oct. 7, 2009

(86) PCT No.: PCT/EP2009/007187
§ 371 (c)(1),
(2), (4) Date: Aug. 19, 2011

(87) PCT Pub. No.: WO2010/043327
PCT Pub. Date: Apr. 22, 2010

(65) Prior Publication Data
US 2011/0298606 A1 Dec. 8, 2011

(30) Foreign Application Priority Data
Oct. 15, 2008 (DE) .......................... 10 2008 051 681

(51) Int. Cl.
*B60Q 1/00* (2006.01)
(52) U.S. Cl.
USPC ........... 340/445; 340/438; 340/439; 340/447; 340/448
(58) Field of Classification Search
USPC ...... 340/438, 445, 439, 447, 448; 356/237.2, 356/520; 702/98; 73/146.5, 146.8
See application file for complete search history.

(56) References Cited

U.S. PATENT DOCUMENTS

| 5,231,873 | A | * | 8/1993 | Lindberg | 73/149 |
| 5,335,540 | A | * | 8/1994 | Bowler et al. | 73/146.5 |

(Continued)

FOREIGN PATENT DOCUMENTS

| DE | 103 01 192 | 7/2004 |
| DE | 600 15 749 | 3/2006 |

(Continued)

OTHER PUBLICATIONS

European Patent Office, International Preliminary Report on Patentability and Written Opinion, Apr. 28, 2011, from International Patent Application No. PCT/EP2009/007187, filed on Oct. 7, 2009.
European Patent Office, Translation of International Preliminary Report on Patentability and Written Opinion, Apr. 28, 2011, from International Patent Application No. PCT/EP2009/0071 87, filed on Oct. 7, 2009.

*Primary Examiner* — Daryl Pope
(74) *Attorney, Agent, or Firm* — Kenyon & Kenyon LLP (57) ABSTRACT

A device is described for detecting and wirelessly transmitting at least one measurement signal of the state of a vehicle tire of a vehicle (e.g., tire pressure and/or tire air temperature), which has at least one sensor module arranged in/on the vehicle tire and at least one sensor for detecting the measurement signal, and an energy store which supplies the sensor module with electrical energy, the sensor module having an apparatus for checking the functional capability of the sensor module, having at least one test routine and activating arrangement to activate the test routine, which includes: an apparatus which activates the start of the test routine as a function of the field strength of a magnetic field acting in the area of the sensor module, and/or an apparatus which has an electric circuit and which activates the start of the test routine as a function of a current flowing through the electric circuit, and/or c) an apparatus having an acceleration sensor which activates the start of the test routine as a function of the acceleration acting on the sensor module.

16 Claims, 3 Drawing Sheets

(56) References Cited

U.S. PATENT DOCUMENTS

| | | |
|---|---|---|
| 7,088,226 B2 | 8/2006 | McClelland et al. |
| 2002/0078741 A1 | 6/2002 | Cantu et al. |
| 2002/0130771 A1 | 9/2002 | Osborne et al. |
| 2004/0069057 A1 | 4/2004 | Sapir |
| 2005/0082912 A1 | 4/2005 | Junger et al. |
| 2005/0115356 A1* | 6/2005 | Petty ................................ 74/562 |
| 2006/0076079 A1* | 4/2006 | Petty ................................ 141/98 |
| 2008/0147347 A1* | 6/2008 | Shaw et al. .................... 702/108 |

FOREIGN PATENT DOCUMENTS

| | | |
|---|---|---|
| DE | 600 28 101 | 11/2006 |
| DE | 10 2007 07136 | 8/2008 |

* cited by examiner

TIRE PRESSURE MONITORING SYSTEM HAVING A TEST FUNCTION FOR THE SENSOR MODULE

FIELD OF THE INVENTION

The present invention relates to a device for detecting and wirelessly transmitting at least one measurement signal characterizing the state of a vehicle tire of a vehicle, such as the tire pressure and/or tire air temperature, containing at least one sensor module which is arranged in or on the vehicle tire and has at least one sensor for detecting the measurement signal, and having an energy store which supplies the sensor module with electrical energy.

BACKGROUND INFORMATION

Devices for detecting and transmitting at least one measurement signal characterizing the state of a vehicle tire, such as the tire pressure and/or the tire air temperature, are, in particular, tire pressure monitoring systems (TPMS) and are used to monitor the tire pressure in vehicles in order to prevent tire defects owing to an excessively low tire pressure, and therefore to reduce the number of accidents which are due to defective tires.

If a vehicle is operated with an excessively low tire pressure, this leads to increased flexing energy at the tire edges and therefore to increased wear of the tire. At high accelerations, a tire which is weakened in this way can, under certain circumstances, no longer stand the load and burst. In addition to damage to the tire, creeping tire collapse owing to the gas diffusion through the rubber of the tire over time is a significant cause of excessively low pressure in tires.

However, the tire inflation pressure is not only an important variable for road safety. The driving comfort, service life of the tire and fuel consumption are also significantly influenced by the inflation pressure. An inflation pressure which is reduced by 0.6 bar can increase the fuel consumption by up to 4% and shorten the service life of the tire by up to 50%.

The increasing number of tires with run-flat properties also requires the use of tire pressure monitoring systems since a car driver can no longer detect a tire with considerable underpressure on the basis of the driving behavior. In order to prevent the driver unknowingly exceeding the speed limits and distance limits which are valid for such a case, run-flat tires are allowed to be used only in conjunction with tire pressure monitoring systems or flat rolling warning systems.

Basically, two types of tire pressure monitoring system are differentiated: direct and indirect systems.

In direct systems, a sensor module with a pressure sensor is installed in each tire of the vehicle. Said sensor module transmits data from the interior of the tire, such as the tire pressure and the tire air temperature, to a control unit over an encoded radiofrequency transmission link. These data can be evaluated in the control unit and therefore, in addition to pressure losses in individual tires, slow pressure losses in all the tires (for example owing to diffusion through the rubber) are also detected. If the tire pressure drops below a defined threshold or if the pressure gradient exceeds a specific value, the driver is warned by a visual or acoustic signal. The sensor modules are generally supplied by a battery. This gives rise to additional requirements in terms of power consumption, resistance to media and acceleration sensitivity compared to other applications. Micro-mechanical absolute pressure sensors are used as the sensor elements.

The data which are measured with pressure and temperature sensor in the tire are conditioned in the sensor module, modulated onto an RF carrier signal and emitted via an antenna. This signal is either detected by individual antennas on the wheel cases or in a central receiver (for example in the control unit of existing remote keyless entry systems).

In indirect systems, a pressure loss in the tire is not determined directly but rather by a derived variable. For this purpose, a mathematical-statistical evaluation of the differences in the speeds of all the wheels from one another is carried out.

The wheel speed which is required for this is determined in vehicles with ABS systems by sensors which are already present, and said wheel speed is transferred to the ABS control unit. Differences in wheel speed occur if the diameter of the corresponding tire is reduced due to pressure loss, and therefore its wheel speed rises in relation to the other three tires. By forming differences, which can be carried out by cost-effective expansion of the ABS software algorithms, relatively large pressure losses on up to three tires can be detected.

Disadvantages of the indirect system are comparatively long detection time periods (10 mins) and a high detection threshold compared to direct systems. Current indirect systems which are commercially available are not capable of detecting slow pressure losses in all four tires due to diffusion. A further disadvantage of direct systems over indirect systems is the significantly higher costs and the battery-dependent, limited service life.

Depending on the type of activation of the transmission of data from the sensor module to the control unit, three systems are essentially known in the sensor modules. Continuously transmitting sensor modules; sensor modules which transmit only in the driving state of the vehicle, and sensor modules which transmit only when they are triggered by an LF trigger, for example.

Permanently transmitting sensor modules transmit their measurement signals to the control unit at fixed time intervals. Sensor modules which transmit only in the driving state of the vehicle generally have acceleration sensors by which the driving state can be detected as a function of the measurement signal.

These types of sensor modules are in the not-yet-installed delivery state in a current-saving standby mode, from which they first have to be changed into the operating mode. For this purpose, the sensor modules must be registered with the control unit and assigned to a vehicle tire.

A device of the generic type is discussed, for example, in German patent document DE 103 01 192 A1. A problem with the sensor modules of such devices is that hitherto their functional capability has been tested by a special RF communication module, which also includes checking the charge state of the electric energy store. However, this requires additional investment on the part of the vehicle workshops.

Furthermore, the sensor modules can also be installed without being tested. However, if it becomes apparent that the energy store in one sensor module or in some of the sensor modules installed on the vehicle is empty or defective, these sensor modules which have already been installed in or on the vehicle tire have to be removed again and replaced with functionally capable sensor modules, which entails a certain degree of expenditure.

The exemplary embodiments and/or exemplary methods of the present invention is therefore based on the object of further developing a device of the type mentioned at the beginning in such a way that simpler functional checking of the sensor modules is possible.

This object may be achieved according to the exemplary embodiments and/or exemplary methods of the present invention by the features described herein.

SUMMARY OF THE INVENTION

The exemplary embodiments and/or exemplary methods of the present invention provides that the sensor module has an apparatus for checking the functional capability of the sensor module, having at least one test routine and an arrangement for activating the test routine, which includes the following:
  a) an apparatus which activates the start of the test routine as a function of the field strength of a magnetic field acting in the area of the sensor module, and/or
  b) an apparatus having an electric circuit which activates the start of the test routine as a function of a current flowing through the electric circuit, and/or
  c) an apparatus having an acceleration sensor which activates the start of the test routine as a function of the acceleration acting on the sensor module.

The test routine can carry out any desired tests which check the functional capability of the sensor module in any respect. As a result, a sensor module can be checked at least before its installation, and installation and subsequent replacement of defective sensor modules can be avoided.

The apparatus for checking the functional capability of the sensor module and the arrangement for activating the test routine can be implemented with an elegantly simple arrangement and cost-effectively.

Advantageous developments and improvements of the present invention specified herein are provided by the further measures also disclosed herein.

According to one embodiment, the test routine includes checking of the charge state of the energy store. This prevents sensor modules with a defective or empty energy store being installed. In particular, it is therefore possible to avoid cases in which an empty energy store is not detected until after installation, by virtue of the absence of a measurement signal.

According to one development of this measure, the test routine includes emission of a measurement signal and checking the charge state of the energy store before, during and after the emission of the measurement signal. As a result, the operating state of the sensor module is simulated by the test routine, and it is checked whether the energy reserve which is present in the energy store is sufficient for this.

The measurement signal which is emitted within the scope of the test routine is, in particular, a measurement signal which originates from a preceding measurement process, is stored in a memory of the apparatus for checking the functional capability of the sensor module and can be read out therefrom.

Alternatively, the apparatus for checking the functional capability of the sensor module can contain at least one load resistor which can be connected to the energy store after the activation of the test routine, and by which the load which is present during a transmission process is then simulated.

One development of this embodiment provides that the sensor module itself has a display apparatus by which the result of the checking of the charge state of the energy store can be displayed. The display apparatus can comprise, for example, at least one LED.

If the arrangement for activating the test routine includes an apparatus which has an electric circuit and which activates the start of the test routine as a function of a current flowing through the electric circuit, it can alternatively be provided that the electric circuit has contacts which are accessible from the outside and is embodied in such a way that it is closed by applying a multimeter to the contacts, and the test routine which is activated as a result generates, and if appropriate changes, a flow of current through the electric circuit or a voltage applied between the contacts, wherein the flow of current or the voltage can be measured and displayed by the multimeter. This constitutes a particularly cost-effective embodiment because such a circuit can easily be implemented on the sensor module and a multimeter is generally present in any vehicle workshop.

If the arrangement for activating the test routine includes an apparatus which activates the start of the test routine as a function of the field strength of a magnetic field acting in the area of the sensor module, this apparatus may have at least one magnetic field sensor and/or one magnetic switch which activates the start of the test routine as a function of the field strength of the magnetic field acting in the area of the sensor module. Such a cost-effective magnetic field source which exceeds a certain magnetic minimum field strength can be formed, for example, by a permanent magnet.

If the sensor module is of the type mentioned at the beginning, which only generates a measurement signal in the driving state of the vehicle and transmits said measurement signal to the control unit, such a sensor module for detecting the driving state of the vehicle contains at least one acceleration sensor. The latter then activates the operating state of the sensor module as a function of the centripetal acceleration or circumferential acceleration at the vehicle wheel. This acceleration sensor which is present in any case in such a sensor module may then also be used, within the context of an advantageous double function, to activate the test routine, for example if the sensor module is correspondingly shaken manually before installation and then the acceleration measured by the acceleration sensor exceeds a certain predefined minimum acceleration.

In order to prevent the test routine being unintentionally activated repeatedly at short time intervals owing to magnetic fields, acceleration loads or short-circuits, and the charge stage of the energy store being therefore undesirably depleted, the apparatus for checking the functional capability of the sensor module may be embodied in such a way that the test routine can be activated only at certain minimum time intervals.

For the same reason, the apparatus for checking the functional capability of the sensor module can be embodied in such a way that the test routine can be activated only in states which deviate from the driving mode of the vehicle, such as in the stationary state of the vehicle or in the delivery state of the sensor module, in which states the sensor module is not yet installed on or in the vehicle tire.

Since it is appropriate to run through the test routine just before the installation of the sensor module, the apparatus for checking the functional capability of the sensor module may be embodied in such a way that the sensor module is switched from the delivery state into the operating state by the activation of the test function.

The apparatus for checking the functional capability of the sensor module can alternatively be embodied in such a way that after the test routine sequence the sensor module is returned to the state prevailing before the test routine sequence, for example back into the delivery state in order to test the sensor module, for example, before it is even delivered.

More precise details can be obtained from the following description of exemplary embodiments. In the exemplary embodiments, identical and identically acting assemblies and components are characterized by the same reference numbers.

Exemplary embodiments of the present invention are illustrated below in the drawing and are explained in more detail in the following description.

DETAILED DESCRIPTION

Figure 1:
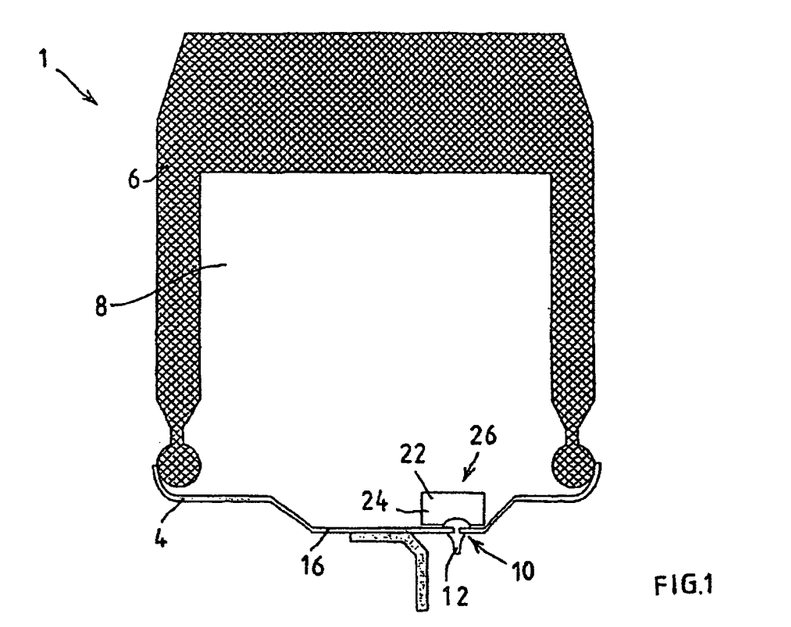
FIG. 1 shows a cross-sectional illustration of a vehicle wheel with a sensor module of a device for detecting and transmitting at least one measurement signal characterizing the state of a vehicle tire, according to an exemplary embodiment of the present invention.
Figure 2:
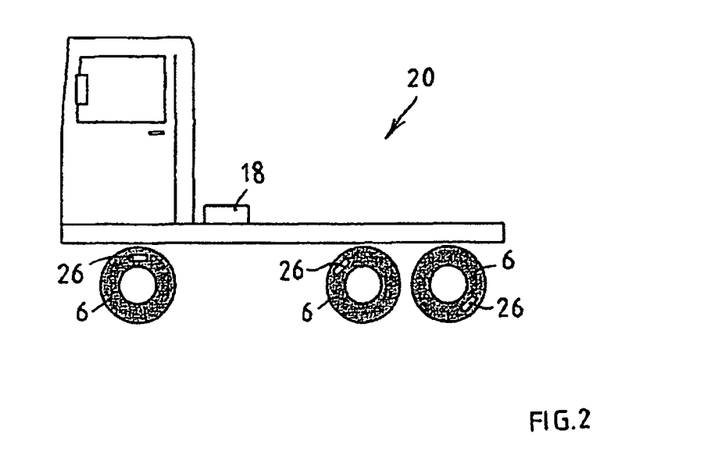
FIG. 2 shows a side view of a traction machine with the device from FIG. 1.

FIG. 1 shows a vehicle wheel 1 of a motor vehicle in cross section, with the vehicle wheel 1 being braked with respect to a chassis shown in FIG. 2 using a disk brake (not shown here). The vehicle wheel 1 is composed essentially of a wheel rim 4 and a fitted tire 6, wherein a compressed air chamber 8 is formed between the tire 6 and the wheel rim 4 and can be inflated and vented through a tire valve 12 which is releasably held in a valve receptacle 10 of the wheel rim 4.

The vehicle wheel 1 is provided with a device 20 for detecting and transmitting at least one measurement signal characterizing the state of the tire 6, such as the tire pressure and/or the tire air temperature in the compressed air chamber 8, which device 20 comprises sensor module 26 containing a tire pressure sensor 22 and a tire air temperature sensor 24. Alternatively, the sensor module 26 could contain just one tire pressure sensor 22 or just one tire air temperature sensor 24 and/or further sensors with which measurement signals characterizing the state of the tire 6 can be generated, such as, for example, an acceleration sensor for detecting a driving state of the motor vehicle as a function of the acceleration signal.

The sensor signal 26 is supplied with electrical energy by an electrical energy source (not shown explicitly here), for example by a replaceable battery, and transmits the values for the tire pressure and the tire air temperature from a compressed air chamber 8 to a control unit 18 in the vehicle via an encoded radiofrequency transmission link, as illustrated in FIG. 2, in which each vehicle tire 6 may be equipped with such a sensor module. These data are evaluated in the control unit 18 and in this way slow pressure losses in all the tires (for example owing to diffusion through the rubber) are also detected as well as pressure losses in individual tires 6. Furthermore, an excessively high tire air temperature can also be detected.

According to the embodiment in FIG. 1, the sensor module 26 can form with the tire valve 12 a structural unit which is accommodated and secured in a valve receptacle 10 in a rim bed 16 of the wheel rim 4. This valve receptacle 10 may be formed by a passage hole in the area of the rim bed 16 of the wheel rim 4. In this context, the part of this structural unit or of the sensor module 26 which bears the tire pressure sensor 22 and the tire air temperature sensor 24 projects into the compressed air chamber 8.

The sensor module 26 has an apparatus for checking the functional capability of the sensor module 26, having at least one test routine and an arrangement for activating the test routine, which includes the following:

a) an apparatus which activates the start of the test routine as a function of the field strength of a magnetic field acting in the area of the sensor module 26, and/or b) an apparatus having an electric circuit which activates the start of the test routine as a function of a current flowing through the electric circuit, and/or c) an apparatus having an acceleration sensor which activates the start of the test routine as a function of the acceleration acting on the sensor module.

As a result, the charge state of the electric energy store of the sensor module 26 can be checked in the not-yet-installed state and installation and replacement of defective sensor modules 26 can be avoided.

According to one embodiment, the test routine includes checking of the charge state of the energy store. This prevents sensor modules 26 with a defective or emptied energy store from being installed.

According to one development of this measure, the test routine includes emission of a measurement signal and checking of the charge state of the energy store before, during and after the emission of the measurement signal. As a result, the test routine simulates the operating state of the sensor module 26 and checks whether the energy reserve which is present in the energy store is sufficient therefor.

The measurement signal which is emitted within the scope of the test routine is, in particular, a measurement signal which originates from a preceding measurement process, is stored in a memory of the apparatus for checking the functional capability of the sensor module 26 and can be read out therefrom.

Alternatively, the apparatus for checking the functional capability of the sensor module 26 can include at least one load resistor which can be connected to the energy store after the activation of the test routine, and by which the load which is present during a transmission process is then simulated.

A particular development of this embodiment provides that the sensor module 26 itself has a display apparatus by which the result of the checking of the charge state of the energy store can be displayed. The display apparatus can comprise, for example, by an LED (light emitting diode).

Figure 3:
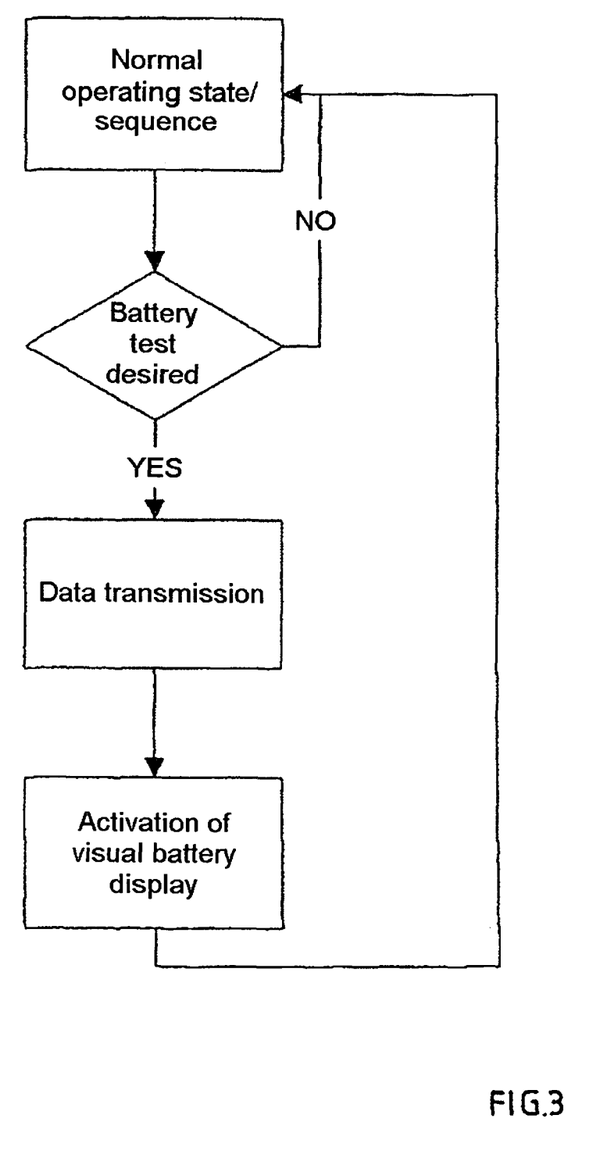
FIG. 3 shows a flowchart of a test routine running in the device from FIG. 1.
Figure 4:
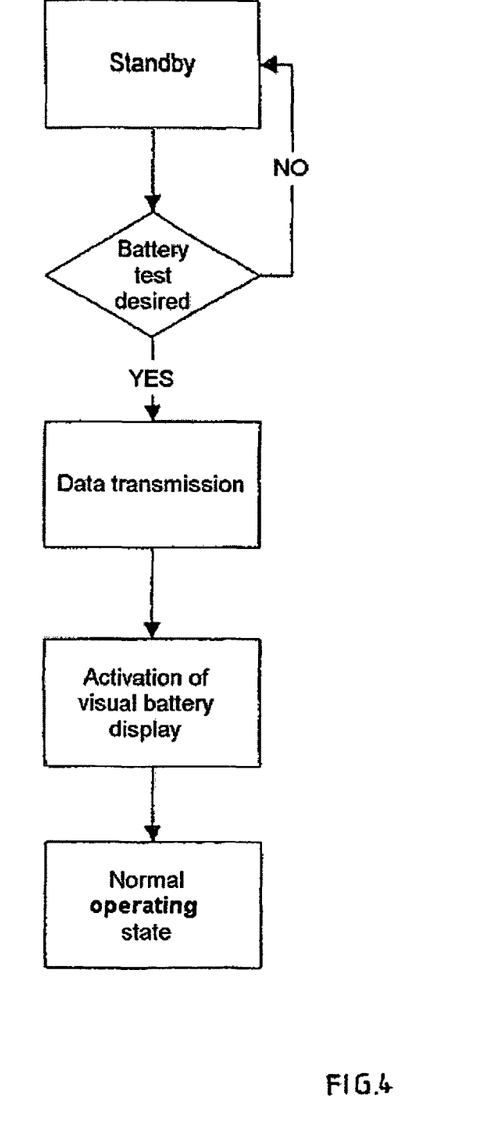
FIG. 4 shows a flowchart of a further test routine running in the device from FIG. 1.

The sequence of such a test routine is shown in FIG. 3. If, for example, starting from the operating state of the sensor module 26, a battery test is desired which is carried out by the above-described possibilities a) to c) for activating the test routine, a measurement signal is generated and emitted (data transmission) and the result is displayed (activation of visual display). The activation of the test routine is symbolized in FIG. 2 and FIG. 3 by a "YES" and non-activation by a "NO" in each case. Therefore, if the acceleration acting on the not-yet-installed sensor module 26 exceeds a predefined minimum acceleration, according to the letter c) above the test routine is activated ("YES"), and otherwise not activated ("NO"). The same applies to the letters a) and b).

The apparatus for checking the functional capability of the sensor module 26 may be embodied in such a way that after the test routine sequence the sensor module 26 is returned automatically to the state prevailing before the test routine sequence, for example back to the delivery state, in order to test the sensor module, for example, before it is even delivered.

For the above case a) in which the arrangement for activating the test routine comprise an apparatus which activates the start of the test routine as a function of the field strength of a magnetic field acting in the area of the sensor module 26, this apparatus may have at least one magnetic field sensor and/or one magnetic switch which activates the start of the test routine as a function of the field strength of the magnetic field acting in the area of the sensor module. Such a cost-effective magnetic field source which exceeds a certain magnetic minimum field strength can be formed, for example, by a permanent magnet.

If according to case b) the arrangement for activating the test routine comprise an apparatus which has an electric circuit and which activates the start of the test routine as a function of a current flowing through the electric circuit, according to one further embodiment there may be provision that the electric circuit has contacts which are accessible from the outside and is embodied in such a way that it is closed by applying a multimeter to the contacts, and the test routine which is activated as a result generates, and if appropriate changes, a flow of current through the electric circuit or a voltage applied between the contacts, wherein the flow of current or the voltage can be measured and displayed by the multimeter. This constitutes a particularly cost-effective embodiment because such a circuit is easy to implement on the sensor module and a multimeter is generally present in any vehicle workshop.

Alternatively, the circuit could also be closed by connecting the electrical contacts by an electrical conductor, which may be by a tool section such as the head of a screwdriver, thereby activating the test routine sequence.

If the sensor module 26 is of the type which only generates a measurement signal in the driving state of the vehicle and transmits said measurement signal to the control unit, such a sensor module contains at least one acceleration sensor for detecting the driving state of the vehicle. The operating state of the sensor module is activated as a function of the measurement signal of this acceleration sensor, i.e. when the centripetal acceleration or circumferential acceleration at the vehicle wheel is high enough. This acceleration sensor which is present in any case in such a sensor module 26 may then also be used to activate the test routine, for example when the sensor module 26 is correspondingly shaken manually before installation and then the acceleration measured by the acceleration sensor exceeds a certain predefined minimum acceleration.

In order to prevent the test routine being repeatedly activated at short time intervals owing to magnetic fields, acceleration loads or short-circuits and as a result the charge state of the energy store being undesirably depleted, the apparatus for checking the functional capability of the sensor module may be embodied in such a way that the test routine can be activated only at certain minimum time intervals.

For the same reason, the apparatus for checking the functional capability of the sensor module can be embodied in such a way that the test routine can be activated only in states which deviate from the driving mode of the vehicle, such as in the stationary state of the vehicle or in the delivery state of the sensor module, in which states the sensor module 26 is not yet installed on or in the vehicle tire.

Since it is appropriate to run through the test routine just before the installation of the sensor module 26, the apparatus for checking the functional capability of the sensor module may be embodied in such a way that the sensor module 26 is switched from the delivery state into the operating state by the activation of the test function. A corresponding sequence diagram of the test routine is shown in FIG. 3.

If, starting from the stand-by delivery state of the sensor module 26, a battery test is desired which is carried out by the above-described possibilities a) to c) for activating the test routine, a measurement signal is generated and emitted (data transmission) and the result is displayed (activation of the visual display). At the same time, the sensor module 26 is placed in the operating state.

The apparatus for checking the functional capability of the sensor module or the test routine may be implemented in a microchip which is integrated into the sensor module 26.

The List of reference numerals is as follows:
1 Vehicle wheel
4 Wheel rim
6 Tire
8 Compressed air chamber
10 Valve receptacle
12 Tire valve
16 Rim bed
18 Control unit
20 Device
22 Tire pressure sensor
24 Tire temperature sensor
26 Sensor module

The invention claimed is:

1. A device for detecting and wirelessly transmitting at least one measurement signal characterizing a state of a vehicle tire of a vehicle, including at least one of a tire pressure and a tire air temperature, comprising:
at least one sensor module, which is arranged in or on the vehicle tire, having at least one sensor for detecting the measurement signal, and having an apparatus for checking a functional capability of the sensor module;
an energy store, which supplies the sensor module with electrical energy; and
a test routine arrangement having at least one test routine and an activating arrangement for activating the test routine, the activating arrangement being configured to perform at least one of the following:
activating a start of the test routine as a function of a field strength of a magnetic field acting in an area of the sensor module,
activating the start of the test routine as a function of a current flowing through an electric circuit, and
activating the start of the test routine as a function of an acceleration acting on the sensor module, the acceleration being measured by an acceleration sensor.

2. The device of claim 1, wherein in that the test routine includes checking a charge state of the energy store.

3. The device of claim 2, wherein the test routine includes emission of a measurement signal and checking the charge state of the energy store before, during and after the emission of the measurement signal.

4. The device of claim 3, wherein the measurement signal is a measurement signal which originates from a preceding measurement process, is stored in a memory of the apparatus for checking the functional capability of the sensor module and can be read out therefrom.

5. The device of claim 2, wherein the apparatus for checking the functional capability of the sensor module includes at least one load resistor which can be connected to the energy store after activating the test routine.

6. The device of claim 1, wherein the sensor module has a display apparatus by which a result of the checking of the sensor module can be displayed.

7. The device of claim 6, wherein the display apparatus includes at least one LED.

8. The device of claim 1, wherein the electric circuit has contacts which are accessible from the outside and is configured so that it is closed by applying a multimeter to the contacts, and the test routine which is activated as a result generates, and if appropriate changes, a flow of current through the electric circuit or a voltage applied between the contacts, and wherein the flow of current or the voltage can be measured and displayed by the multimeter.

9. The device of claim 1, wherein the apparatus for checking the functional capability of the sensor module has at least one of at least one magnetic field sensor and one magnetic switch which activates the start of the test routine as a function of the field strength of the magnetic field acting in the area of the sensor module.

10. The device of claim 1, wherein the sensor module generates a measurement signal only in the driving state of the vehicle, and transmits said measurement signal to the control unit, and includes, for detecting the driving state of the vehicle, at least one acceleration sensor which is included at the same time in the arrangement for activating the test routine.

11. The device of claim 1, wherein the apparatus for checking the functional capability of the sensor module is configured so that the test routine can be activated only at certain minimum time intervals.

12. The device of claim 1, wherein the apparatus for checking the functional capability of the sensor module is configured so that the test routine can be activated only in states which deviate from the driving mode of the vehicle, including in the stationary state of the vehicle or in a delivery state of the sensor module, in which states the sensor module is not installed on or in the vehicle tire.

13. The device of claim 12, wherein the delivery state of the sensor module is by lower consumption of electrical energy compared to an operating state of the sensor module.

14. The device of claim 13, wherein the apparatus for checking the functional capability of the sensor module is configured so that the sensor module is switched from the delivery state into the operating state by the activation of the test function.

15. The device of claim 13, wherein the apparatus for checking the functional capability of the sensor module is configured so that after the test routine sequence the sensor module is returned to the state prevailing before the test routine sequence.

16. A vehicle comprising:
a device for detecting and wirelessly transmitting at least one measurement signal characterizing a state of a vehicle tire of a vehicle, such as the tire pressure and/or tire air temperature, comprising:
at least one sensor module, which is arranged in or on the vehicle tire, having at least one sensor for detecting the measurement signal, and having an apparatus for checking a functional capability of the sensor module;
an energy store, which supplies the sensor module with electrical energy; and
a test routine arrangement having at least one test routine and an activating arrangement for activating the test routine, the activating arrangement being configured to perform at least one of the following:
activating a start of the test routine as a function of a field strength of a magnetic field acting in an area of the sensor module,
activating the start of the test routine as a function of a current flowing through an electric circuit, and
activating the start of the test routine as a function of an acceleration acting on the sensor module, the acceleration being measured by an acceleration sensor.

* * * * *

UNITED STATES PATENT AND TRADEMARK OFFICE
CERTIFICATE OF CORRECTION

PATENT NO. : 8,514,063 B2  Page 1 of 1
APPLICATION NO. : 12/998350
DATED : August 20, 2013
INVENTOR(S) : Markus Stoehr It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 313 days.

Signed and Sealed this

Fifteenth Day of September, 2015

Michelle K. Lee
*Director of the United States Patent and Trademark Office*